(12) United States Patent
Bourdoncle et al.

(10) Patent No.: US 10,140,333 B2
(45) Date of Patent: Nov. 27, 2018

(54) TRUSTED QUERY SYSTEM AND METHOD

(75) Inventors: François Bourdoncle, Paris (FR);
Florian Douetteau, Paris (FR); Jérémie Bordier, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 0 days.

(21) Appl. No.: 13/391,932

(22) PCT Filed: Aug. 26, 2010

(86) PCT No.: PCT/IB2010/002102
§ 371 (c)(1),
(2), (4) Date: Mar. 29, 2012

(87) PCT Pub. No.: WO2011/024064
PCT Pub. Date: Mar. 3, 2011

(65) Prior Publication Data
US 2012/0197864 A1 Aug. 2, 2012

Related U.S. Application Data

(60) Provisional application No. 61/238,283, filed on Aug. 31, 2009.

(51) Int. Cl.
*G06F 7/00* (2006.01)
*G06F 17/30* (2006.01)

(52) U.S. Cl.
CPC .. *G06F 17/30398* (2013.01); *G06F 17/30392* (2013.01); *G06F 17/30424* (2013.01); *G06F 17/30613* (2013.01); *G06F 17/30654* (2013.01)

(58) Field of Classification Search
USPC .......................... 707/602–603, 711, 741, 754
See application file for complete search history.

(56) References Cited

U.S. PATENT DOCUMENTS 6,792,428 B2 * 9/2004 Brandin ............. G06F 17/2247
7,725,450 B1 * 5/2010 Depelteau ......... G06F 17/30958
707/706

(Continued)

FOREIGN PATENT DOCUMENTS

CN 101088082 A 12/2007
CN 101191730 A 6/2008

(Continued)

OTHER PUBLICATIONS

PCT Written Opinion from PCT/IB2010/002102 dated Mar. 21, 2011, 8 pages.

(Continued)

*Primary Examiner* — Jason G Liao
*Assistant Examiner* — Berhanu Mitiku
(74) *Attorney, Agent, or Firm* — Oblon, McClelland, Maier & Neustadt, L.L.P.

(57) ABSTRACT

A method and system provides a search interface that permits a user to interrogate a structured database, and includes retrieving database entries from one or more databases, flattening a plurality of database entries, indexing the plurality of flattened database entries to form a search engine index, and prompting the user to enter an input. The system continuously monitors the user input and each time an input is entered by the user, the system computes a set of non-null partial queries in response to the input entered by the user, associates a structured item to each non-null partial query, and allows the user to select one of the structured items. If the user selects one of the structured items, the system replaces the user input by the non-null partial query associated to the selected structured item. When the user validates the input, the system executes the input as a query. Finally, the system provides documents to the user corresponding to the executed query.

28 Claims, 13 Drawing Sheets

(56) References Cited

U.S. PATENT DOCUMENTS

| | | | |
|---|---|---|---|
| 8,027,970 B1* | 9/2011 | Brette | G06F 17/30474 |
| | | | 707/713 |
| 8,214,370 B1* | 7/2012 | Turon et al. | 707/741 |
| 2007/0005570 A1* | 1/2007 | Hurst-Hiller | G06F 17/30654 |
| 2007/0050352 A1* | 3/2007 | Kim | G06F 17/2223 |
| 2010/0005054 A1* | 1/2010 | Smith et al. | 707/2 |
| 2011/0047120 A1* | 2/2011 | Kamvar et al. | 706/50 |

FOREIGN PATENT DOCUMENTS

| | | |
|---|---|---|
| JP | 2002-269127 | 3/2001 |
| JP | 2003-162545 | 6/2003 |
| JP | 2009-054133 | 3/2009 |
| KR | 2007-0024771 | 3/2007 |
| WO | WO 2006/047654 A2 | 5/2006 |
| WO | WO 2008/133396 A1 | 11/2008 |

OTHER PUBLICATIONS

PCT International Search Report from PCT/IB2010/002102 dated Mar. 21, 2011, 3 pages.
"Techniques of Mail Management and Google Labs Available for Business Use," *PC Japan*, 2009, 14, 69-73.

\* cited by examiner

| Database Table Named "All Leads" | | | 900 |
|---|---|---|---|
| Name | Company | ... | Country |
| Robert Namais | EMC, Inc. | ... | U.S. |
| Annie Apple | EMC, Software | ... | France |
| ... | ... | ... | ... |
| Susie Topper | Apple, Inc. | ... | Namibia |

ROW-1 : All-Leads/Name, Robert Namais; All-Leads/Company, EMC Inc.; ... ; All-Leads/Country, US;

ROW-2 : All-Leads/Name, Annie Apple; All-Leads/Company, EMC Softwrae; ... ; All-Leads/Country, France;

...

ROW-N : All-Leads/Name, Susie Topper; All-Leads/Company, Apple Inc.; ... ; All-Leads/Country, Namibia;

Figure 10

| | 1100 | |
|---|---|---|
| $ | All leads ——1110 | (97) |
| 👥 | All contacts ——1120 | (73) |
| 🚗 | All accounts ——1130 | (21) |

Figure 11

| nam │ | | |
|---|---|---|
| $ | All leads | |
| | name | ... |
| | | Robert Namias (8) |
| | country | Namibia (13) |
| 👥 | All contacts | |
| | name | ... |
| | title | Naming Specialist (7) |

Figure 12

 Nam Inc
Country: India, CIO: Raman Tata
 Eric Nam
Company: EMC, Title: CIO
 Track & Trace
Company: Nam Inc, Amount: $200,000
Figure 13
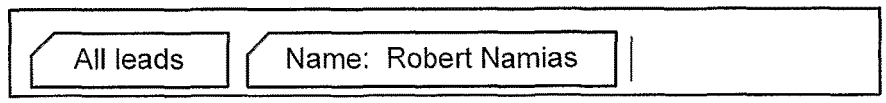
Figure 14
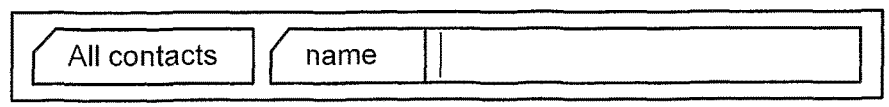
Figure 15

| All contacts | |
|---|---|
| name | ... |
| title | ... |
| department | ... |
| company | ... |

| All contacts | nam | |
|---|---|---|
| name | ... | |
| title | Naming Specialist | (7) |

| All contacts | name | bro |
|---|---|---|
| Robert Brown | | (2) |
| Richard Brownson | | (1) |
| Broderick Enrst | | (4) |

Figure 19

| All contacts | Name: Robert Brown | |
|---|---|---|

Figure 20

| All contacts | Name: Robert Brown | ital | |
|---|---|---|---|
| country | Italy | | (1) |

Figure 21

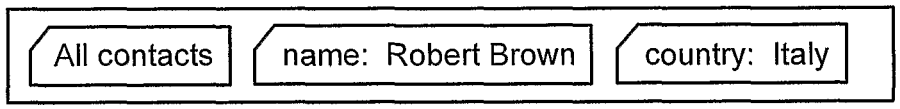
 Robert Brown
Company: EMC, Title: CIO, Country: Italy
Figure 22

TRUSTED QUERY SYSTEM AND METHOD

CROSS-REFERENCE TO RELATED APPLICATIONS

This application claims the benefit of priority from Provisional Patent Application Ser. No. 61/238,283, filed on Aug. 31, 2009, entitled Trusted Query System and Method. Application Ser. No. 61/238,283 is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © 2010, Exalead, All Rights Reserved.

BACKGROUND OF THE INVENTION

1. Field of the Invention

This disclosure relates generally to data storage and retrieval. More particularly, this disclosure refers to a system and method which allows a user to search for data accessible with a structured query language.

2. Description of the Related Art

A database consists of an organized collection of data for one or more multiple uses. One way of classifying databases involves the type of content, for example, bibliographic, full-text, numeric, image, and the like. Other classification methods examine database models or database architectures, as explained below.

The data in a database is structured by software according to a database model. The relational database model is most commonly used. Other models, such as the hierarchical model and the network model, use a more explicit structured representation of relationships. A relational database matches data by using common characteristics found within the data set. The resulting groups of data are structured in a way that is easier for many people to understand. For example, a data set containing all the real-estate transactions in a town can be grouped by the year the transaction occurred, by the sale price of the transaction, or by the buyer's last name, and so on. Such a grouping uses the relational model (also referred to as "schema"). Hence, such a database is called a "relational database."

The software used to perform such structuring and grouping is called a relational database management system (RDBMS). The term "relational database" often refers to this type of software. Relational databases are currently the predominant choice used for storing financial records, manufacturing and logistical information, personnel data, and much more. Specifically, a relational database is a collection of relations, frequently referred to as tables. Tables consist of rows of data values or keys in labeled and typed columns. Some database management systems require that users identify themselves before posing queries, and some rows or columns within a table, or full tables may or may not be visible to a given identified user, depending on the access rights defined for that user.

A query on a database is an instantiation of a formula for requesting data from a database that specifies conditions that must satisfied by the answers to the query. A structured query is a query formulated according to a structured grammar. One such grammar is specified in the Structured Query Language (SQL), which is a widely used language for accessing data in relational database management systems (RDBMS). A database retrieval system is a software program or set of programs that process user queries over one or more databases.

Query processing means taking an instantiated user query as input, parsing the query to understand what conditions are specified in the query, accessing the data from database, and returning answers from the database that satisfy the conditions specified in the query. A well structured query is a query that respects the grammar implemented in the database retrieval system.

An instantiated query is a query that has at least one condition. Native database functions are those operations that a database management system can perform on a database, including creating a database, modifying a database, and processing a query on a database. The search result from a database query is usually a list of all the database elements that fulfill the conditions specified in the query.

A search engine is a software program or set of programs that fetch pieces of information, often called documents, from a variety of information sources, that index that information and that provide means for accessing some representation of the original information using those indexes in response to a query. The original information, or document, may be a text document, such as web page, email, PDF file, an image file, a video file, an audio file, a row from a database, or any other piece of information that is subject to analysis.

It is possible to index the content of a database by running a database query over a database and treating every item in the result list as a document.

In addition to the indexing of the content of a database, it is possible to previously flatten the content of the database. The "flattening" method consists in combining multiple tables and multiples rows from the database to create a document.

Search engines, for example, GOOGLE™, or YAHOO!™, usually have a unique query box for entering a user query, as compared to a database interface, which might have multiple search boxes, possibly one for every field in a table. Search engines often have a very simple input grammar, for example, receiving as input a single word and returning all indexed web pages containing that word. This is an example of free text search because the word may appear anywhere in the resulting document. If the entire document fetched by the search engine can be searched, then the search engine implements full text search.

Documents may also be divided into sections, which are recognized by the search engine. Such sections include paragraphs sections, title section, or body section. Some search engines allow a user to restrict a query to a specified section or field. The search result of a search engine query is a list of documents that match the query. This list is usually ordered according to a ranking strategy, such as ranking by document length (by presenting shorter documents first) or by ranking that compares the density of the words in the query with the words in each document.

While free text search formulates a valid query for the search engine, they usually provide support for more sophisticated queries. For example, popular search engines, such as GOOGLE, often support Boolean operators (e.g., Disney AND world) or operators configured to target specific parts of the document, such as "intitle: Disney," which searches for the term "Disney" only within the title of the document. Many other variations for sectionalizing the documents are also possible.

Search engines often use an inverted index of all the terms that they have extracted from the documents fetched. The inverted index indicates where, in what document, a term is found. A list of terms extracted from this index allows a search engine to propose auto-completion while a user is typing the query into a query box. Auto-completion is a mechanism of indicating which indexed terms are possible completions of the string that a user is currently typing. Auto-completion is performed by a process that monitors what the user is typing, and may propose possible completions after every keystroke. Each proposed completion in auto-completion might be an indexed term that could be used as a query in a search engine, and for which the search engine knows that there exists a document corresponding to this term.

Search engines often implement spell checking over user queries. In spell checking, for queries with few or no results, the search engine may propose other terms from its inverted index that may be what the user intended to type.

In addition to spell checking, a search engine may also provide other search mechanisms, for example, a search term, such as dogs, might be stemmed or lemmatized so that it also matches the term dog. Another example of search engine query syntax might be to use a star (*) operator to match any number of characters, so that a search query dog* would also match the inverted index terms dog, dogs, dogged, dog-eared, etc. Use of the star operator in this manner is called prefix match.

One might also define the use of quotes around a search query to turn off default stemming to impose a perfect match. For example, "dogs" would only match the term dogs in the inverted index but would not match the term dog. A search engine might also implement a search using a lexical semantic structure, such as a thesaurus, so that a search on the word dog might also retrieve documents containing the word pet, assuming that the thesaurus indicates a relation between dog and pet and that this relation is activated during query processing.

Building queries for both search engines retrieval and database retrieval that use the syntactic possibilities may be difficult for the ordinary information seeker. Advanced query syntax is difficult to master and only a small percentage of information seekers can master this syntax without significant training.

Commercially available products exist that guide a user in the construction of database queries. For example, DISCOVER™ from ORACLE™ of Redwood Shores, Calif., includes a query generator that allows a user to construct a query by selecting items from a drop down list of items displayed on the screen. The items may represent data which are to be obtained from the database, or alternatively they may represent operations that are to be performed on this data. Once the items have been selected, the query generator generates a query, usually in SQL, which can then be sent to a database retrieval system for execution.

In an article entitled 'Combining Free-word Search and Relational Databases', by M. Hassan, R. Alhajj, and M. J. Rodley, the authors write: "Structured query languages are rich to allow querying the contents and the structure of a relational database with well known structure and characteristics. However, given a dynamic database, i.e., a database with a varying or unknown structure makes the query formulation process a very difficult task," The above-mentioned authors propose a system for exploring the contents and structure of databases by transforming a simple search-engine-like query into a series of database requests, using Java Database Connectivity. Java Database Connectivity (JDBC) is a technology that enables the Java program to manipulate data stored into the database. In an "all levels" mode, once a query consisting of one or two words connected by a specified Boolean connector is submitted, the JDBC database requests are sent to all visible databases, and any database name, table name, column name, or value that matches the query, is displayed.

Business Intelligence refers to computer-based techniques for gathering, consolidating, modeling and delivering material and immaterial data of a company in order to support better business decision-making and to provide to the executive management an overview of the activity of the company. One main drawback of many known business intelligence systems stems in that they often require the intervention of one or more specialists able to handle complex structured query. For instance, whenever an executive manager has a specific request, he or she will be obliged to express it to a database specialist, whose role is to design a complex structured query in order to provide an appropriate answer satisfying the request. The dialog and the designing of the complex structured query are time-consuming. This requirement thus represents a serious constraint in the growth of business intelligence system. There is therefore a need for a method and system for formulating a request using a comprehensive and intuitive tool, such as a search engine, which implements free-text search with a certain level of trust.

BRIEF SUMMARY

The embodiments described in this document differ from the above methods in a number of ways. In one embodiment of the invention, user input at every keystroke is monitored and all possible completions of the user input are proposed. Other embodiments describe structured queries that can be run over a given database using a search engine, rather than running all possible queries. Some embodiments further use a copy of the information in the databases rather than the database retrieval system themselves, which provide advantages based on the speed and scalability of search engine technology. Search engines are generally very fast and produce results in the sub-second range rather than in the multiple second or minute range, which a database retrieval system might require to respond to a query. Some embodiments further aid the user by producing only trusted queries, which have non-null answers. Other embodiments further provide the user with the result counts of the proposed trusted queries.

In one embodiment, the trusted query system provides a means for a user, who is not necessarily skilled in the art of database construction and manipulation, to access the contents of a database by iteratively producing trusted queries, i.e., structured queries that are both valid on the database and that are known to have matching, instantiated records in the database. A structured query restricts the user query to certain values or certain fields over the databases being queried. As referred to herein, the word query means a structured query performed by a search engine.

In one embodiment, the method for performing trusted queries on a database includes retrieving database entries from one or more databases, flattening a plurality of database entries, indexing the plurality of flattened database entries to form a search engine index, and prompting the user to enter an input. The system continuously monitors the user input and each time an input is entered by the user, the system computes a set of non-null partial queries in response to the input entered by the user, associates a structured item to each non-null partial query, and allows the user to select one of the structured items. If the user selects one of the structured items, the system replaces the user input by the non-null partial query associated to the selected structured item. When the user validates the input, the system executes the input as a query. Finally, the system provides documents to the user corresponding to the executed query.

In another embodiment, a computer program product includes a computer useable medium and computer readable code embodied on the computer useable medium for performing trusted queries on a search engine, based on input from a user. The computer readable code for execution by a processor when executed, causes the processor to retrieve entries from one or more databases, flatten a plurality of database entries, index the plurality of flattened database entries to form a search engine index, and prompts the user to enter input. The computer program product continuously monitors the user input, and each time an input is entered by the user, the processor computes a set of non-null partial queries in response to the input entered by the use, associates a structured item to each non-null partial query, and allows the user to select one of the structured items. If the user selects one of the structured items, the processor replaces the user input by the non-null partial query associated to the selected structured item. When the user validates the input, the processor executes the input as a query, and provides documents to the user corresponding to the executed query.

In a further embodiment, a system for performing trusted queries on a search engine, based on input from a user, includes a processor configured to retrieve database entries from one or more databases, a database flattening component configured to flatten the database entries, a database indexing component configured to index the flattened database entries to from a search engine index, and a display screen configured to prompt the user to enter input. The processor continuously monitors the user input and processes the user input entered by the user by computing a set of non-null partial queries in response to the input entered by the user, associating a structured item to each non-null partial query, allowing the user to select one of the structured items; and if the user selects one of the structured items, replacing the user input by the non-null partial query associated to the selected structured item. When the user validates the input, the processor executes the input as a query and provides documents to the user corresponding to the executed query.

Providing and generating trusted queries according to some embodiments described herein are important because using free-text to formulate queries is inherently ambiguous, and such ambiguity may be a problem when result sets are used in the context of decision making, for example, in the context of business intelligence applications when drawing a pie-chart that counts certain items/categories in the results set. Therefore, there is a need for a trusted query system and method that suggests an interpretation, that is, a structured query process that anticipates what the user may have in mind when formulating a free-text query. This is important in order to create a certain level of "trust" when using free text to formulate queries. This is of particular importance in the context of business intelligence.

BRIEF DESCRIPTION OF THE DRAWINGS

The system and method may be better understood with reference to the following drawings along with the below description. The components in the figures are not necessarily to scale, emphasis instead being placed upon illustrating the principles of the invention. Moreover, in the figures, like reference numerals designate corresponding parts throughout the different views.

FIGS. 9 and 10 are pictorial drawings showing instantiated examples of a database and its flattened form, according to a specific embodiment; and FIGS. 11-22 illustrate various screen displays of a trusted query interface according to specific embodiments of the invention.

DETAILED DESCRIPTION

Figure 1:
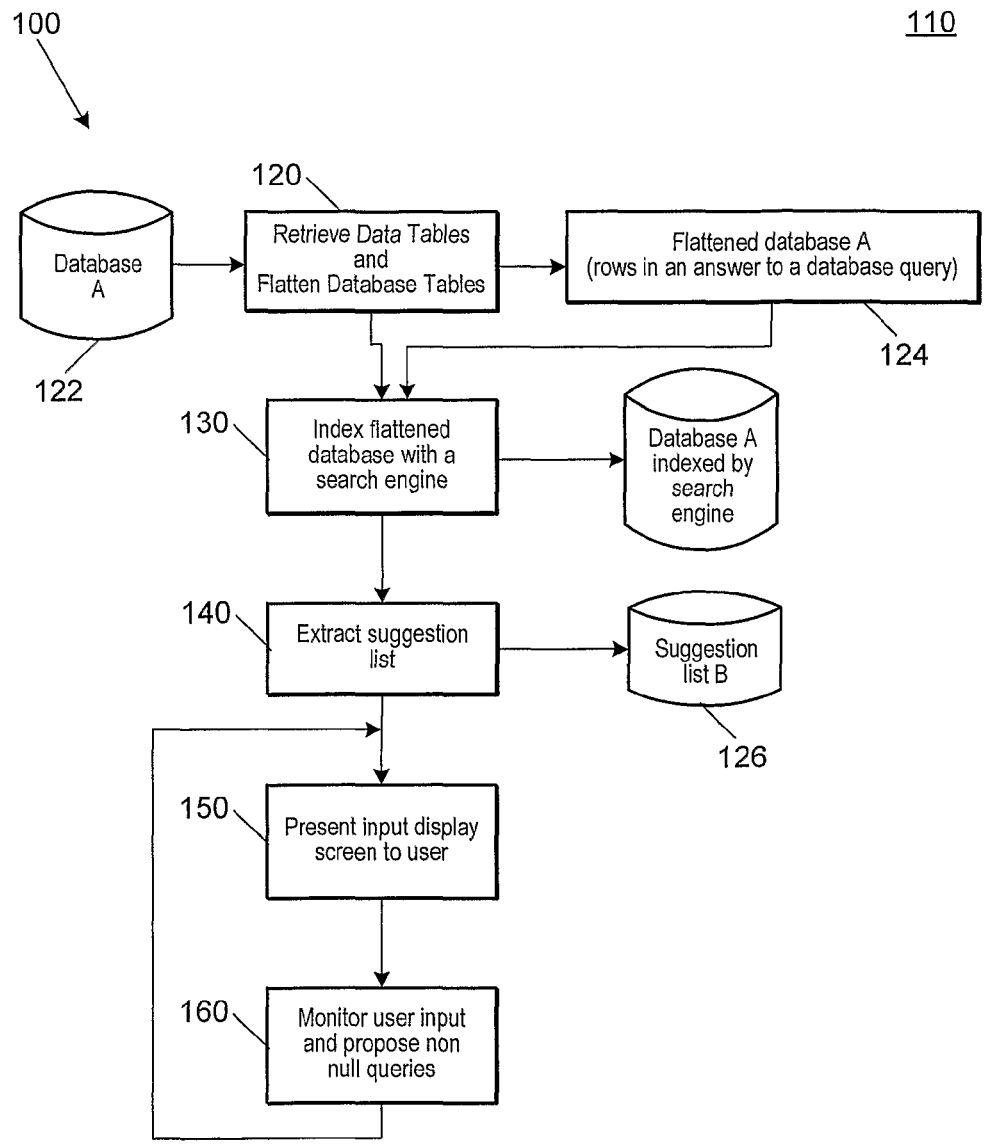
FIG. 1 is a flowchart according to one embodiment of the invention showing the steps that may be taken by the trusted query method and system.

FIG. 1 is a flowchart showing operation of the trusted query system, including steps (100) that may be taken according to one embodiment of the trusted query system 110. As an overview of the user process, and according to a specific embodiment, the user is presented with an interface, such as a GUI or graphical user interface, to query a database using a search engine. The user then begins typing his or her query into a query box of the search engine. In a preferred embodiment, after each keystroke is typed, the system displays versions of instantiated and partially instantiated queries that would return a non-null set of records from the database.

At any time, the user can (i) click on query suggestions proposed by the system 110, (ii) enter more text in the displayed query box, or (iii) submit the current query to the underlying search engine or database retrieval system. Alternatively, the user may use a speech-to-text interface as data input to the system 110 rather than typing. In the following description, it is assumed that the user is using a text entry interface.

One advantage of the trusted query method and system 110 is that the user never formulates a query that would produce zero results. During the process described herein, the user could enter text that could lead to a zero result, but the trusted query method and system 110 first warns the user that such a query will return zero results before the user validates the query. The system 110 may also suggest alternatives, for example, via spell checking at that point.

Although it may be theoretically possible to generate all such queries producing non-zero results before the user begins typing, the combinatorially large number of possibilities would require storage space many orders of magnitude greater than the size of the original database being queried by the search engine, and thus is not feasible or economically viable. Using the embodiments as described herein, it is not necessary to explicitly generate all the possible queries that could be run over the database since possible non-null queries are generated in real-time or on the fly, as explained below, by rapid search engine lookup.

Because the trusted query method and system 110 according to one embodiment uses underlying search engine technology rather than native database functions, the system 110 provides full text search and other search engine capabilities that might not be present in the underlying database system. For example, the trusted query method and system 110 provides:

Language detection

Tokenization and normalization, with sentence boundary recognition (parsing text into individual words and sentences, applying language-specific rules regarding separators like white space and punctuation)

Stemming (identification of words sharing the same stem, for example, "engine" and "engines")

Lemmatization, morphological and syntactic processing (identification of not only basic stems but of more complex variants, like "good" and "better," and applying language-specific knowledge of word and sentence construction patterns)

In specific embodiments of the trusted query method and system, commercially available software, such as a search engine, may be used to index the underlying database, once flattened. Such commercially available search engines preferably include "SPLIT" operator capability. The underlying database (or possibly more than one database) is first fully indexed by a search engine to create a search engine index, and thus the search engine then operates on the search engine index, rather than the original database. Thereafter, based on the user query, the search engine returns documents acquired from the search engine index, and such results represent the rows of the original database, as explained below. Of course, the search engine index may include many structures or sub-structures, as required for memory efficiency and processing speed. Alternatively, indexing may be performed in multiple "batches" to minimize memory usage and promote efficient processing. Thus, the entire search engine index need not be resident in memory at one time.

Referring now to FIG. 1, the steps 110 for performing the trusted query method according to one embodiment is outlined in a high-level format. Selected high-level steps described in this paragraph will be described in greater detail below. In a first step 120, database tables are retrieved from a database ("A") 122, and the tables are flattened and are stored in a flattened database storage 124. This process is shown in greater detail in FIG. 3. Next, the flattened database 124 is indexed using a search engine or other suitable tool 130. A suggestion list is then extracted 140 and saved in a suggestion list ("B") 126. An input display screen is then presented to the user 150 to permit the user to enter various search terms or queries. Processing then continuously monitors the user input and proposes queries to the user that result in non-null responses to the query 160. This step iteratively loops to provide the trusted query processing to the user.

Figure 7:
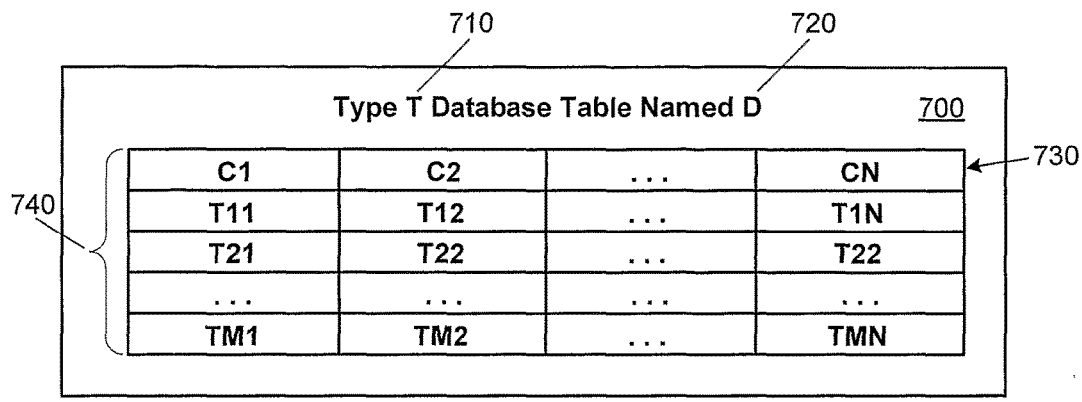
FIG. 7 is a pictorial drawing showing a typical database table according to one embodiment of the invention.

With respect to the flattening step 120 of FIG. 1, a database table 700 shown in FIG. 7 is accessed, which is a simplified representation of a typical database table. The database table 700 from a database is of type T (710) with name D (720), and is composed of a plurality of database table columns 730 labeled C1, C2, . . . , CN, and a plurality (M) of database table rows 740 instantiated with values T11, T12, . . . T1N, T21, T22, . . . T2N, up to TM1, . . . , TMN. Note that in this description, the terms "column" and "field" will be used interchangeably.

In step 120 of FIG. 1, the database A may be flattened using known database flattening techniques, and may be flattened into a specific format in which each row contains information identifying the database table type, the database table name, the database column names (field names) and the instantiated values in the database table rows. Any suitable search engine may be used to flatten the database, such as the CLOUDVIEW™ search engine available from Exalead S.A. of France. During step 120, a plurality of databases and a plurality of tables in each database may be flattened and indexed, although for purposes of illustration only, one such table is shown in FIG. 7.

Figure 2:
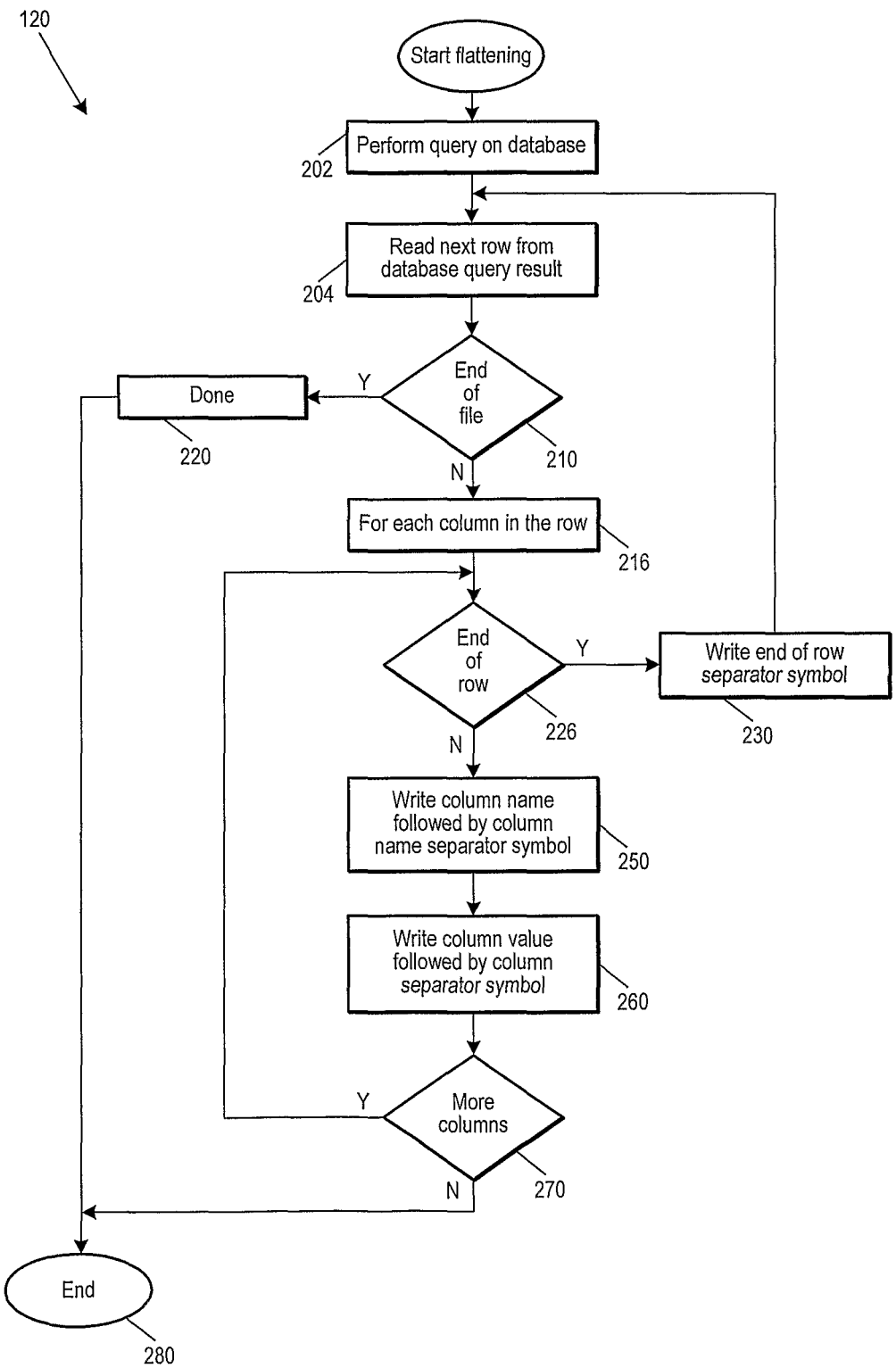
FIG. 2 is a flowchart showing the steps that may be taken to flattening a database according to a specific embodiment.
Figure 8:
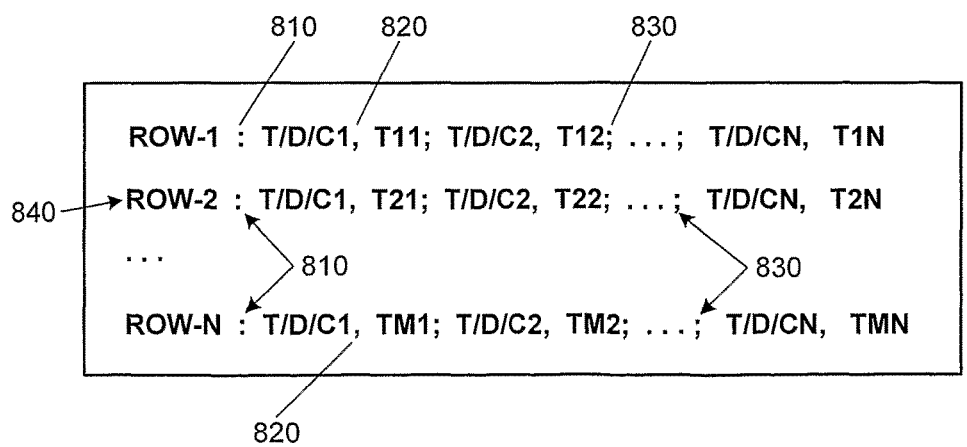
FIG. 8 shows how the database of FIG. 7 can be represented in search engine.

FIG. 2 shows the steps taken for flattening a database in greater detail, and correspond to step 120 of FIG. 1. For example, database table of FIG. 7 is shown converted to a flattened form, which is shown in FIG. 8. The flattened format shown in FIG. 8 replicates each database table row on a single line of text separated by colons 810, commas 820 and semicolons, and show positions indicating the row numbers, the column names, and the column values. For example, the value of the second column of the second row, T22 of FIG. 7, appears in FIG. 8 as the line:

ROW-2: T/D/C1, T21; T/D/C2, T22; . . . ; T/D/CN, T2N

In this example as shown in FIG. 8, the first field, ROW-2, 840 (separated by a semicolon) indicates that this line corresponds to the second row of the table. This semicolon is followed by N fields. The second of these fields contains two items separated by a comma, namely T/D/C2 and T22. Because this field is the second field after the colon, it corresponds to the second column in the table. The first item in this field gives a hierarchical representation of the database type T (optional value), the database table name D, and the field or column name, C2. Note that these separating conventions can be replaced by any suitable or equivalent separating schemes, and a description of such suitable separating schemes may be found at the following "URL: http://en.wikipedia.org/wiki/Flat" file database.

As shown in FIG. 2, a query is performed on the database 202 using the search engine, and a next row of the database query result is read or input into the system 204. If processing does not encounter the end of the database query result 210, then for each column 216, a check is made to determine if the end of the row has been encountered 226. If the end of the row has been encountered 226, an "end of row" separator symbol is written at the end of that row 230, and processing transfers back to step 204 to read the next row.

If the end of the row has not been encountered 226, the column name followed by the column name separator symbol is written into the file 250. Next, the column value followed by the column separator symbol is written into the file 260. A check is then made to determine if more columns exist in the file 270. If more columns exist, processing transfers back to step 226 completely process a row. If no additional columns exist, processing transfers to an exit point 280. In step 210, if the end of file is encountered, the routine is considered to be complete 290, processing transfers to the exit point 280. The flattening process allows the search engine to search in all the columns names and field values at once, thus allowing to build suggest list over all this data in one efficient query.

Referring back to FIG. 1, in step 130, the flattened version of the database A is indexed, along with all other databases that have been flattened in step 120. Flattening the database may be performed using a commercially available or standard search engine that allows for searching within sections of a document. Such a standard search engine receives a document as input and places all the words in the documents in an inverted file data structure, which can subsequently be processed to match user queries to documents containing the user query terms. In the flattened database example given in FIG. 8, sections of the document are separated by a semicolon.

Figure 3:
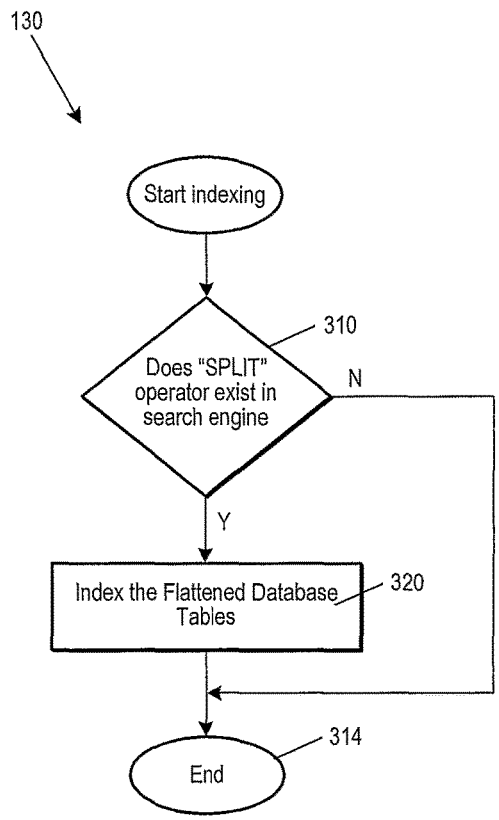
FIG. 3 is a flowchart showing the steps that may be taken to index a flattened database table according to a specific embodiment.

FIG. 3 shows additional details regarding the indexing step shown in step 130 of FIG. 1. First, a check is made to determine if the commercially available search engine provides a SPLIT operator capability 310. A SPLIT operator allows a user to search within a section of the document. If no SPLIT operator is available 310, processing exits 314. If the SPLIT operator is available, the flattened database table is indexed 320, and processing then exits 314.

For example, the following search (T/D/C2 AND T22) SPLIT ";" would return the document ROW-2 in this example. FIG. 9 shows an example of a table called "All leads" 900 extracted from a customer relations database, while FIG. 10 shows its flattened version 1000. This database table called "All_Leads" in FIGS. 9 and 10, and similarly processed database tables not shown here, will be used to illustrate the functioning of the trusted query system and method described in greater detail below.

Next, referring back to FIG. 1, a list of all the terms indexed during the indexing step (130) is written into a word list "B," as shown in step 140. This step may be optional. The word list B may be created simultaneously with the indexing step 130, or may be created after step 130, or not at all. The word list B may be used for spell-checking purposes and other natural language processing, such as phonetic searching.

The user is then presented with a display (150) or other interface in which the user can enter text into a query box and/or click various selections using an input device, such as, for example, a keyboard, pointing device, touch sensitive screen, voice input, etc. Suitable commercially available voice recognition software and/or hardware may be used to implement voice recognition and process voice commands issued by the user. Preferably, in the initial display presented to the user, all indexed database tables are displayed, one per line, with the number of indexed rows per table. An example of this presentation 1100 is shown in FIG. 11 in which three tables «All-Leads» 1110, «All-Contacts» 1120 and «All-Accounts» 1130 are indexed with 97, 73 and 21 rows indexed, respectively.

In step 160 shown in FIG. 1, any user input entered into the query box activates an iterative process of trusted query suggestion generation. A trusted query is a query fulfilling the following conditions:
  (a) the query is a well-structured query for the search engine; and
  (b) when executed on the search engine, the query returns a non-null plurality of answers. Optionally, if user permissions are needed to access the database contents, then when the trusted query is executed by the identified end-user, the query will return a non-null plurality of answers for that identified end-user.

In step 160, after each letter or phoneme is input by the user using the input device, a query is generated and executed over the search engine index, corresponding the text entered by the user. The above process shown in steps 150 and 160 repeats iteratively to perform the trusted database query process 100.

Figure 4:
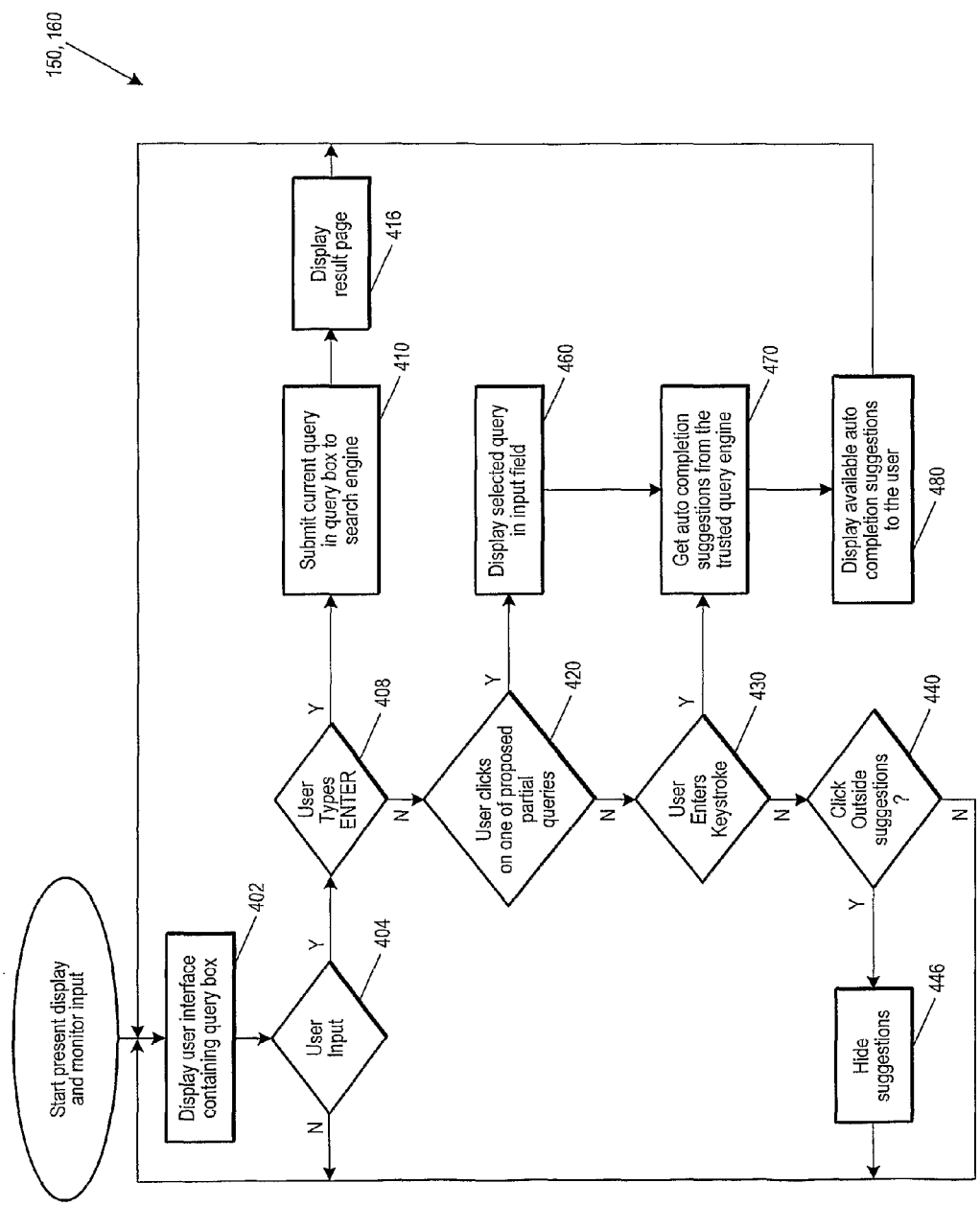
FIG. 4 is a flowchart according to a specific embodiment showing the steps that may be taken for user input and monitoring.

FIG. 4 shows additional details of steps 150 and 160 of FIG. 1. First, a user interface showing a query box is presented to the user 150 so that the user may enter a query. Step 150 is shown in this figure for continuity. As mentioned above, any suitable data entry or request method may be used. Processing loops continuously 404 waiting for user input. After the user has input his or her data or query, processing determines if the "enter" key has been depressed 408. If the enter key has been depressed 408, the query entered (validated) by the user is submitted to the search engine 410, the result page is processed for presentation to the user 416, and processing branches back to displaying the user interface 150. In another embodiment, the query entered by the user is mapped into the syntax of the one or more original databases 122, the mapped queries are executed over the database(s), and database search results are presented to the user 416.

If the user does not press the enter key 408, processing determines if the user has clicked one of the proposed partial queries 420. If the user has not clicked one of the proposed partial queries 420, processing determines if the user has entered keystrokes 430. If the user has not entered keystrokes 430, processing determines if the user has clicked on an outside suggestion 440. If the user has clicked on an outside suggestion 440, the suggestions may be hidden to the user 446, and processing branches back to displaying the user interface 150. In one embodiment, the suggestions may be hidden because the user has clicked on an area outside of the suggestions provided, and thus it is assumed that the user is not focused or interested in the search field.

If the user has clicked on one of the proposed partial queries 420, the selected query is displayed in the input field of the query input box 460. Next, auto-completion suggestions are obtained from the trusted query processing 470, which will be explained in greater detail below with reference to FIG. 5. After the auto completion suggestions are obtained from the trusted query processing 470, the auto-completion suggestions are processed for display to the user 480, and processing branches back to displaying the user interface 150.

In step 430, if the user has entered keystrokes, the auto completion suggestions are obtained from the trusted query processing 470. If processing determines that the user does not clicked on the outside suggestions 440, processing branches back to displaying user interface 150.

Figure 5:
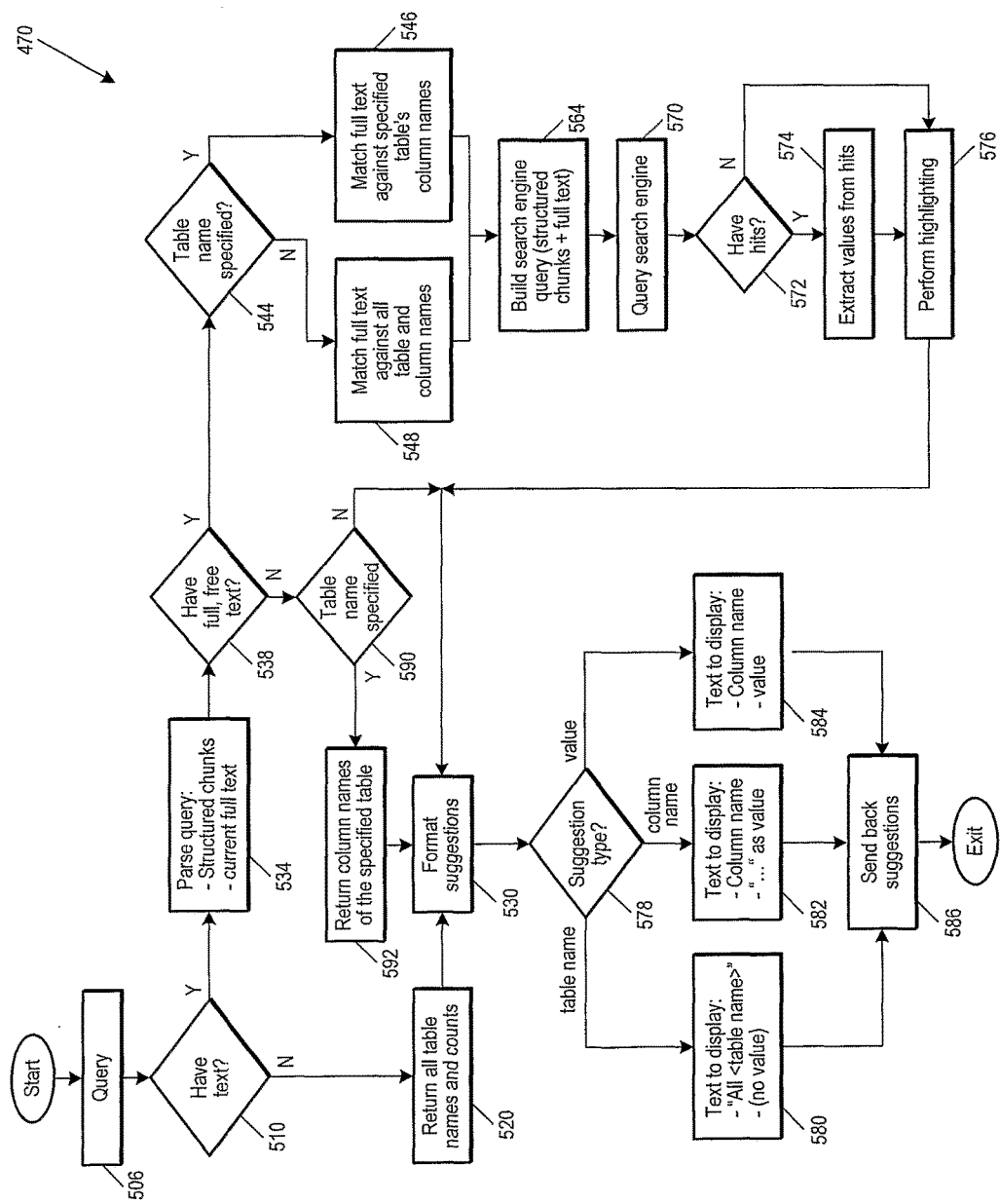
FIG. 5 is a flowchart according to a specific embodiment showing how trusted queries are generated after every user keystroke.

The process of obtaining the auto-completion suggestions shown in step 470 is shown in greater detail in FIG. 5, and such auto-completion suggestions displayed correspond to the possible valid completion of terms found in the indexed flattened databases. The process of auto-completion involves predicting a word or phrase that the user may want to enter, but without requiring the user to actually type the word or phrase completely.

The auto-completion feature according to one embodiment illustrated with respect to step 470 is particularly effective when it is easy to predict the word or phrase being typed based on words or phrases already typed in by the user, such as when there are a limited number of possible or commonly used words, as may be the case with e-mail programs, web browsers, or command line interpreters, or when editing text written in a highly-structured, easy-to-predict language, such as in source code editors. Auto-completion speeds up human-computer interactions and improves the user satisfaction.

Auto-completion in one embodiment of the trusted query system 110 allows the user to auto-complete the table names in an SQL statement and column names of the tables referenced in the SQL statement. As text is typed into the editor, the context of the cursor within the SQL statement provides an indication of whether the user needs a table completion or a table column completion. The table completion provides a list of tables available in the database server to which the user is connected. The column completion provides a list of columns for only tables referenced in the SQL statement.

Auto-completion processing in one embodiment of the trusted query system 110 may be similar to commercially available software programs, such as Aqua Data Studio, release 7.5 from AquaFold, Inc., which provides, in addition to an SQL editor, auto-completion tools for various queries in a database. In many word processing programs, auto-completion decreases the amount of time spent typing repetitive words and phrases. The source material for auto-completion may be gathered from the current document that the user is working on, or from a list of common words defined by the user.

Currently, OpenOffice.org from Oracle Corp. of Redwood City, Calif., StarOffice from Sun Microsystems, Inc., Microsoft Office from Microsoft Corp, and KOffice from KDE corp., for example, include the above-described support for auto-completion, as do advanced text editors, such as Emacs and Vim. In command line interpreters, such as Unix's sh or bash, or Microsoft Windows's cmd.exe or PowerShell, or in similar command line interfaces, auto-completion of command names and file names may be accomplished by tracking of all the possible names of things the user may access.

In some programs, auto-completion may be performed by pressing the Tab ⇆ key after typing the first several letters of the word. For example, if the only file in a current directory that starts with x is xLongFileName, the user may prefer to type x, and auto-complete for the complete name. If another file name or command starting with x existed in the same scope, the user would type additional letters or press the Tab key repeatedly to select the appropriate text. In some embodiments of the trusted database query, a valid completion may be any column name found in the original database, or any partial match of a row value in the original database. Both column names and row values have been indexed in some embodiments of the invention.

FIG. 5 shows the auto-completion suggestions process of step 470 of FIG. 4 in greater detail. First, the contents of the query box are analyzed 506. If the query box is empty 510, then all the tables name and counts of rows in each table are fetched 520 as suggestions from the search engine index, and are formatted 530.

If the query box contains text 510, the query is parsed 534. Parsing recognizes and identifies the table names and column names in the query box (the structured chunks) and recognizes full, free text entered by the user in order to generate structured suggestions.

After parsing 534, processing determines if full, free text has been recognized as a result of the parsing 538. If full, free text has been parsed 538, processing branches to determine whether a table name appears in the query box 544. At this point, processing determines whether the new text follows a table name. If a table name does appear in the query box 544, the columns names of the specified table are fetched and matched against all table and column names 546, and then the structured query is built 564.

Queries over the flattened database are generated involving all the words and/or field names already entered in the query box. Step 544 determines whether a table name has been specified in the previous structured chunks. If so, a match of the full text against the table column names (546) is performed. If a table name has not been specified (544) in the previous structured chunks, a match against all table names and all table column names is performed 548.

If there is no table name specified 544, then the full, free text is matched against all table names and their column names 548 to generate suggestions. Whether the table name is found 546 or is not found 548, the structured query is then built 564. This structured query may be constructed by concatenating all the structure chunks in the query box (table names and column names) with an AND operator, and adding the full text search on the detected free text.

When the query partially or wholly matches the prefix of a column name of a flattened database table (see step 548), the table name of the matched column is displayed in a window on the user interface, and the partially or wholly matched column is also displayed with the matching parts in bold or highlight 576. When the query partially or wholly matches the value of a database table column, then the database table name where the value is found is displayed in a window on the user interface. Also displayed is the column name where the value is found, along with the value, which is displayed with its matching part in bold or highlight 576. The number of instantiated rows corresponding the matched column name, or matched column value with its column name is also displayed, for example, as a number in parentheses.

The structured query constructed as described above is then sent to the search engine 570. If this structured query has matching results (hits) in the search engine 572, the suggestions are extracted from these results 574. Each of the extracted results may contain a table name, a column name, and a value. The suggestions extracted correspond to values for a given table and a given column, where the values correspond to the free text, either by perfect match or match of a prefix of a word appearing in the value of the specified column of the specified table.

Next, all the suggestions created in steps 546, 548 and 574 are gathered, and the matching parts are highlighted 576. The highlighted suggestions are then formatted 530. In the drawings, the highlighted portions are also shown in an increased font size for purposes of illustration. However, any form of text emphasis may be used to easily point out to proposed query to the user. If this structured query does not have matching results (hits) in the search engine 572, then there are no suggestions to extract, and highlighting is performed 576. Because highlighting is an iterative process for each query hit, if there are not hits, no highlighting is performed.

The formatting process 530 iterates over the suggestions it receives and according to the suggestion type of each suggestion, formats the displays according. If the suggestion type is a table name 578, all table names are processed for display 580. If the suggestion type is a column name 578, all column names are processed for display 582. Similarly, if the suggestion type is a value 578, all column names and values are processed for display 584. After the suggestion type is processed for display 580, 582, 584, the process suggestions are returned 586, and made available for display. Processing then returns back to its subroutine call point, as shown in step 470 of FIG. 4. Examples of such formatted displays are shown in at least FIGS. 11, 12, 16 and 17.

Returning back to step 538, if full, free text has not been parsed, processing determines whether a table name has been specified 590. If a table name has not been specified 590, processing branches so as to format the suggestions 530. If a table name has been specified 590, the column names of the specified table are returned 592, and processing branches so as to format the suggestions 530. Note that if full, free text is not available, a "structured chunk" describing the table name will be available corresponding to the column names of the specified table.

In a preferred embodiment, each row of the flattened database tables is indexed as a separate document in which the table name appears, as well as the names of each column, along with the values of each column formatted in such a way (for example as shown in FIG. 10) so that it is possible to distinguish database table names, column names and column values, and to associate column values with their column names. Any other suitable method of indexing documents that retains the distinction between database table names and column names and column values, can be used. For example, one might separately index all of the database table names and the table column names in one search engine index, and separately index all of the database values in another search engine index.

In one embodiment, a simple or structured thesaurus or lexical semantic structure, such as an ontology, may be used to map the actual values in the flattened database to a set of alternative values at the time of indexing or at query time. An ontology is a formal representation of a set of concepts within a domain and the relationships between those concepts. An ontology may be used to reason about the properties of that domain, and may be used to define the domain. In theory, an ontology is a 'formal, explicit specification of a shared conceptualization.'

An ontology provides a shared vocabulary, which can be used to model a domain, that is, the type of objects and/or concepts that exist, and their properties and relations. Ontologics are used in artificial intelligence, the Semantic Web, software engineering, biomedical informatics, library science, and information architecture as a form of knowledge representation about the world or some part of it. Most ontologies describe individuals (instances), classes (concepts), attributes, and relations. (see "http://en.wikipedia.org/wiki/Ontology_(computer_science)" for additional detail).

For example, an ontology might specify that «dog» has an alternative value «poodle». In this case, the user query may match an ontology alternative to the column value, and either the ontology alternative or the original query value, or both, can be displayed while the user enters his or her query.

In another alternative embodiment, when the query matches a column name, and that column name contains only numerical values in the original database, the column name can be displayed in the user interface with an additional menu displaying symbols indicating that the system will display the sum, or the average, or the count, etc., of all the column values matching the query, rather than the individual values themselves.

FIG. 12 shows an example of the results of these processes, once the user has entered the three letters «nam» in the query box shown in FIG. 11. These letters are a partial match (shown in bold) of a column name («name») in the «All-Leads» table. They are also a partial match on the content of a number of rows in the «All-Leads» table, partially matching «Robert Namais» in the «name» column of eight rows, and partially matching «Namibia» appearing in 18 rows in the «All-Leads» table. Similarly, the entered string «nam» also matches column names («name») and row values in the flattened «All-Contacts» table. The structured items can be displayed in a visually hierarchical fashion, as shown in FIG. 12, such as where the user sees that "Namibia" is a value in the "country" field of the "All-leads" table, or that "name" is another field in this "All-leads" table. The presented structured items help the user interpret the associated non-null partial query. Each structured item provides explicit disambiguation of the search intent of the user, and thus provides the user with a certain level of trust that their search is both being correctly interpreted and fruitful. Such structured items may be presented in hierarchical form ordered according to any suitable ordering criteria, for example, in alphabetical order, based on popularity, or based on the number of occurrences found.

Once the user has entered some text, as shown in FIG. 12, the user can decide the following:
1. To enter more text (producing an output such as seen in FIG. 12, with values corresponding to the new strings entered);
2. To press the return key, and thus validating the query, which sends the contents of the current text box as a query (see FIG. 13); or
3. To click on one of the instantiated fields on the display.
    (A) If the instantiated field contains a partial match in the content part, then that match replaces the current text in the query box. For example, if the user clicks on the box containing «Robert Namias» in FIG. 12, then the FIG. 14 will be displayed to the user. In this figure, we see that because the field clicked upon «Robert Namias» appears in the «name» field of the «All-leads» table, the table and the field name now appear in the query box, replacing the text entered by the user. This corresponds to the process 460 shown in FIG. 4 ("display selected query in input field").
    (B) If the user clicks on a partial match that corresponds to a field name, such as the field name «name» in the «All-contacts» section of FIG. 12, then this column name appears in the query box, as shown in FIG. 15.
    (C) In general, all the words in the free part of the query box (following the structured part that contains table names and column names or value), all such remaining words that match either the table name, the column name, or the value of the selected clicked-on suggestion, are removed from the free text part and are replaced by a structured part.

Figures 16, 17, 18:

If the query box is empty, as shown in FIG. 11, and the user clicks on a table name, then the column names of the table are displayed on the interface, as shown in FIG. 16 which appears if the user clicks on the table name «All-contacts» in FIG. 11.

At this point, the user can enter free text, whose corresponding auto-completion suggestions are then constrained to this database table, as shown in FIG. 17. Alternatively, the user can click on a field name, which causes this field name appear in the query box, as shown in FIG. 18, and thereafter, further text entry produces trusted queries restricted to this field, as shown in FIG. 19.

In FIG. 20, the result when the user has selected one of the above-described suggestions is shown. In FIG. 21, an example of the result of typing text into the trusted query of FIG. 18 is shown, which text partially matches row content in some other column of the results of the trusted query of FIG. 18. The user can also press the return key to send the current trusted query to the underlying search engine, as shown in FIG. 22.

Figure 6:
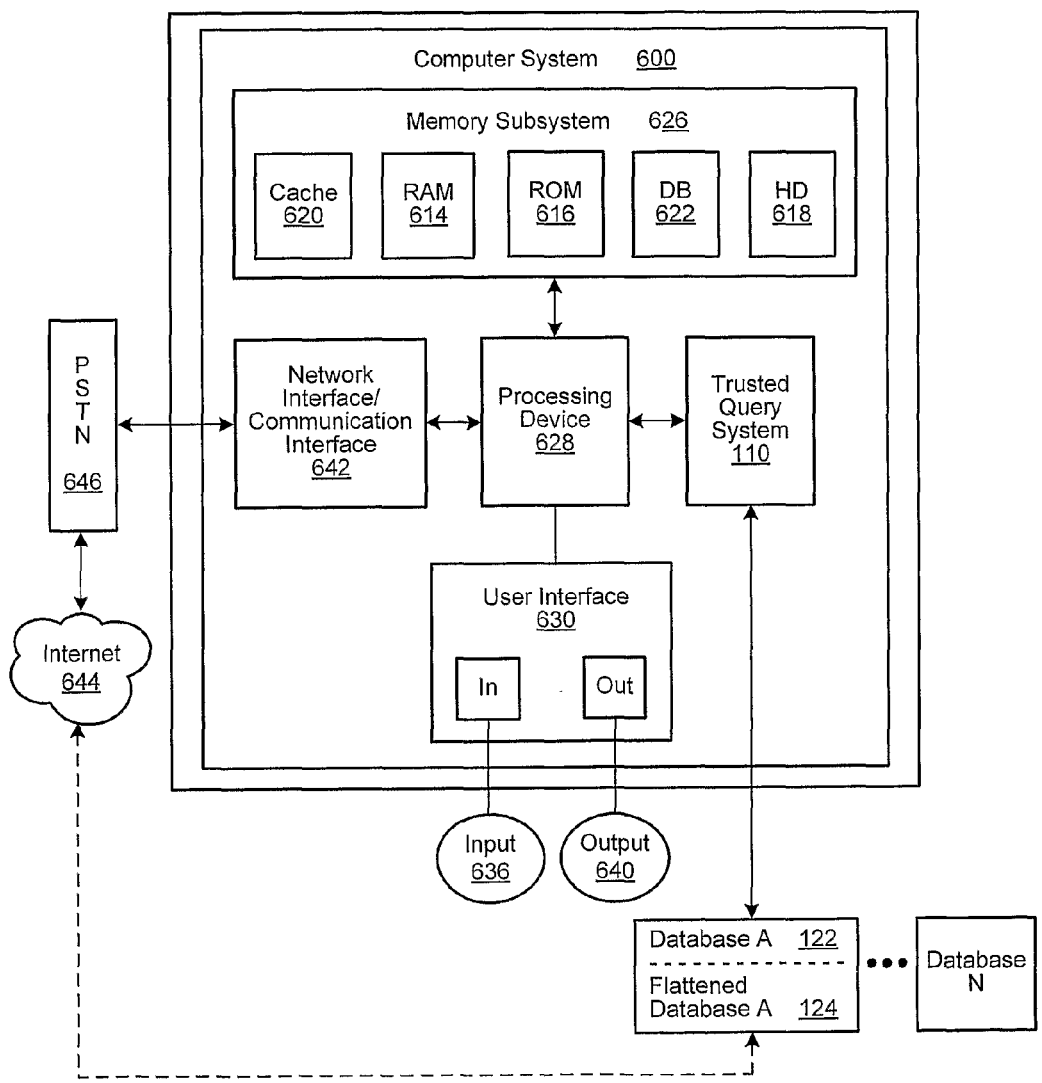
FIG. 6 is a block diagram of a computer system that can be used to implement the method according to several embodiments of the invention.

Referring now to FIG. 6, a high-level hardware block diagram of one embodiment of a system used to perform trusted query searching is shown. The trusted query system may be embodied as a system cooperating with computer hardware components and/or as computer-implemented methods. The trusted query system 110 may include a plurality of software modules or subsystems. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

Furthermore, FIG. 6 is a high-level hardware block diagram of a computer system 600 that may be used to execute software or logic to implement the trusted query processing. The computer 600 may be a personal computer and may include various hardware components, such as RAM 614, ROM 616, hard disk storage 618, cache memory 620, database storage 622, and the like (also referred to as "memory subsystem 627"). The computer 600 may include any suitable processing device 628, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 628 may be an Intel Pentium® microprocessor, x86 compatible microprocessor, or equivalent device, and may be incorporated into a server, a personal computer, or any suitable computing platform.

The memory subsystem 626 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 630 may be coupled to the computer 600 and may include various input devices 636, such as switches selectable by the system manager and/or a keyboard. The user interface also may include suitable output devices 640, such as an LCD display, a CRT, various LED indicators, a printer, and/or a speech output device, as is known in the art.

To facilitate communication between the computer 600 and external sources, a communication interface 642 may be operatively coupled to the computer system. The communication interface 642 may be, for example, a local area network, such as an Ethernet network, intranet, Internet, or other suitable network 544. The communication interface 642 may also be connected to a public switched telephone network (PSTN) 646 or POTS (plain old telephone system), which may facilitate communication via the Internet 644. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for example, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for performing queries on a search engine, based on input from a user, the method comprising:
   retrieving database entries from one or more relational databases;
   flattening the one or more relational databases with a plurality of the database entries;
   indexing the plurality of flattened database entries to form a full-text search engine index;
   prompting the user to enter an input;
   continuously monitoring the user input;
   each time an input is entered by the user, processing the user input by:
   computing a set of non-null partial queries in response to the input entered by the user, the non-null partial queries each being both valid on the one or more relational databases and having matching, instantiated records on the one or more relational databases thereby always resulting in non-null responses;

associating a structured item to each non-null partial query;
allowing the user to select one of the structured items;
if the user selects one of the structured items, replacing the user input by the nonnull partial query associated to the selected structured item;
when the user validates the input, executing the input as a query; and
providing documents to the user corresponding to the executed query.

2. The method according to claim 1, wherein the input is performed with a keyboard and/or a pointing device.

3. The method of claim 1, wherein the input is performed with voice command.

4. The method according to claim 2, wherein the input entered by the user is processed after each keystroke.

5. The method according to claim 1, wherein the validated query is run against the search engine index.

6. The method according to claim 1, wherein the validated query is mapped into a syntax of each of the one or more databases, the mapped queries are executed against the databases, and the results are merged.

7. The method according to claim 1, wherein flattening the database entries generates corresponding flattened entries, each flattened entry replicating each row of the database entry as a single line of text containing information corresponding to a database table type, a database table name, a database column name, and instantiated values in database table rows.

8. The method according to claim 1, wherein a search engine flattens the database entries, the search engine supporting a SPLIT operation, and is configured to search within sections of a document contained in the database.

9. The method according to claim 7, wherein the search engine utilizes an inverted file data structure.

10. The method according to claim 8, wherein the search engine performs the functions selected from the group consisting of a spell-checking function, thesaurus function, stemming function, lemmatizing function, tokenization function, and normalization function.

11. The method according to claim 1, wherein computing a set of non-null partial queries in response to the input entered by the user includes auto-completion suggestions.

12. The method according to claim 1, wherein each structured item is presented with highlighting corresponding to the user input.

13. The method according to claim 1, wherein each structured item is presented in a hierarchical manner.

14. A computer program product stored on a non-transitory computer usable storage medium, comprising:
computer readable code embodied on said computer useable medium for performing queries on a search engine, based on input from a user, the computer readable code for execution by a processor that when executed, causes the processor to:
retrieve database entries from one or more relational databases;
flatten the one or more relational databases with a plurality of the database entries;
index the plurality of flattened database entries to form a full-text search engine index;
prompt the user to enter an input; continuously monitor the user input;
each time an input is entered by the user, processing the user input by:
computing a set of non-null partial queries in response to the input entered by the user, the non-null partial queries each being both valid on the one or more databases and having matching, instantiated records on the one or more relational databases thereby always resulting in non-null responses;
associating a structured item to each non-null partial query;
allowing the user to select one of the structured items;
if the user selects one of the structured items, replacing the user input by the non-null partial query associated to the selected structured item;
when the user validates the input, execute the input as a query; and
provide documents to the user corresponding to the executed query.

15. The computer program product according to claim 14, wherein the input is performed with a keyboard and/or a pointing device.

16. The computer program product according to claim 14, wherein the input is performed with voice command.

17. The computer program product according to claim 14, wherein the input entered by the user is processed after each keystroke.

18. The computer program product according to claim 14, wherein the validated query is run against the search engine index.

19. The computer program product according to claim 14, wherein the validated query is mapped into a syntax of each of the one or more databases, the mapped queries are executed against the databases, and the results are merged.

20. The computer program product according to claim 14, wherein flattening the database entries generates corresponding flattened entries, each flattened entry replicating each row of the database entry as a single line of text with delimiters separating row numbers, column names, and column values, corresponding to the database entry.

21. The computer program product according to claim 14, wherein the search engine utilizes an inverted file data structure.

22. The computer program product according to claim 14, wherein a search engine flattens the database entries, the search engine supporting a SPLIT operation, and is configured to search within sections of a document contained in the database.

23. The computer program product according to claim 22, wherein the search engine performs the functions selected from the group consisting of a spell-checking function, thesaurus function, stemming function, lemmatizing function, tokenization function, and normalization function.

24. The computer program product according to claim 14, wherein computing a set of non-null partial queries in response to the input entered by the user includes auto-completion suggestions.

25. The computer program product according to claim 14, wherein each structured item is presented with highlighting corresponding to the user input.

26. The computer program product according to claim 14, wherein each structured item is presented in a hierarchical manner.

27. A system for performing queries on a search engine, based on input from a user, comprising:
a processor configured to retrieve database entries from one or more relational databases;
a database flattening component configured to flatten the one or more relational databases with the database entries;

a database indexing component configured to index the flattened database entries to form a full-text search engine index;

a display screen configured to prompt the user to enter input;

the processor continuously monitoring the user input and processing the user input entered by the user by:

computing a set of non-null partial queries in response to the input entered by the user, the non-null partial queries each being both valid on the one or more relational databases and having matching, instantiated records on the one or more relational databases thereby always resulting in non-null responses;

associating a structured item to each non-null partial query;

allowing the user to select one of the structured items; and if the user selects one of the structured items, replacing the user input by the non-null partial query associated to the selected structured item; and wherein when the user validates the input, the processor executes the input as a query and provides documents to the user corresponding to the executed query.

28. A method for performing queries on a search engine, based on input from a user, the method comprising:

retrieving database entries from one or more relational databases;

flattening the one or more relational databases with a plurality of the database entries;

indexing the plurality of flattened database entries to form a full-text search engine index;

prompting the user to enter an input;

continuously monitoring the user input;

each time an input is entered by the user, processing the user input by:

computing a set of non-null partial queries in response to the input entered by the user, the non-null partial queries each being both valid on the one or more relational databases and having matching, instantiated records on the one or more relational databases thereby always resulting in non-null responses;

associating a structured item to each non-null partial query;

allowing the user to select one of the structured items;

if the user selects one of the structured items, replacing the user input by the nonnull partial query associated to the selected structured item;

when the user validates the input, executing the input as a query; and providing documents to the user corresponding to the executed query, wherein flattening the database entries generates corresponding flattened entries, each flattened entry replicating each row of the database entry as a single line of text containing information corresponding to a database table type, a database table name, a database column name, and instantiated values in database table rows, wherein the search engine performs the functions selected from the group consisting of a spell-checking function, thesaurus function, stemming function, lemmatizing function, tokenization function, and normalization function, and wherein computing a set of non-null partial queries in response to the input entered by the user includes auto-completion suggestions.

* * * * *